United States Patent Office 3,579,706
Patented May 25, 1971

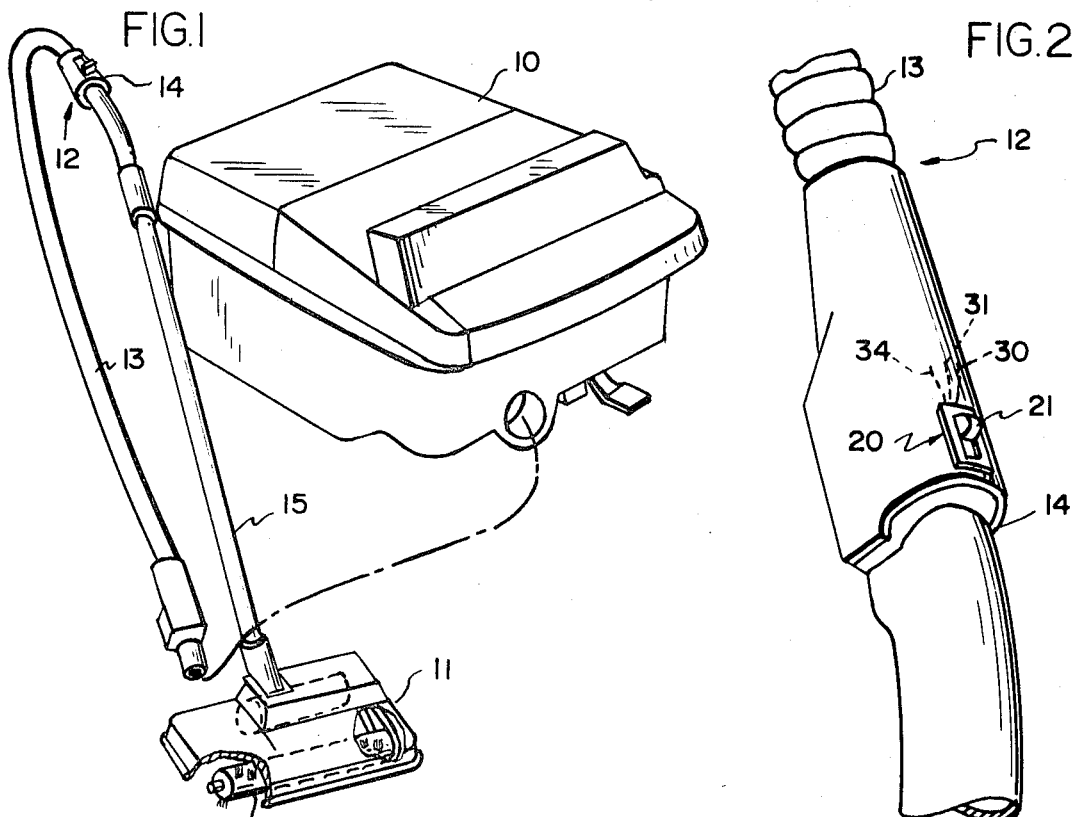
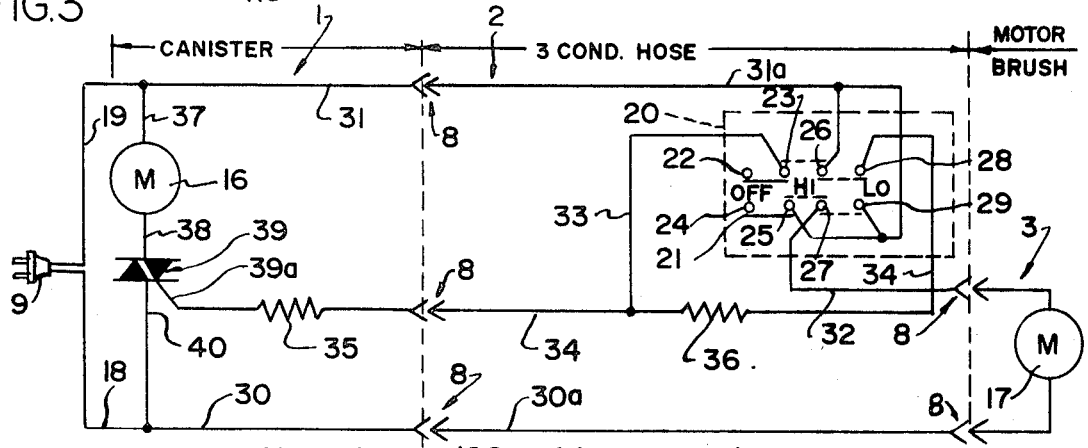
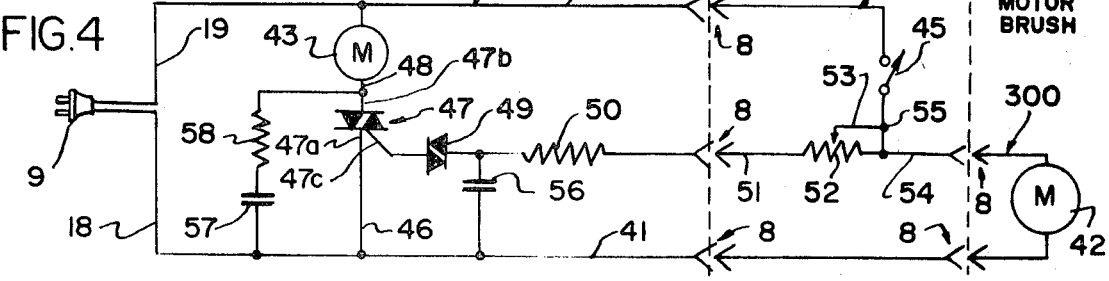

3,579,706
VACUUM CLEANER MOTOR CONTROL
Thomas E. Hetland, St. Paul, Minn., assignor to
Whirlpool Corporation
Filed Nov. 12, 1968, Ser. No. 774,922
Int. Cl. A47l 5/36
U.S. Cl. 15—327                                    10 Claims

ABSTRACT OF THE DISCLOSURE

A vacuum cleaner having a first electric motor for a motor fan unit, a second electric motor for a floor contacting motor brush unit and a switch for controlling both of the motors that can conveniently be mounted on the handle of the hose assembly for connection to the motor brush unit. The switch control mechanism preferably comprises a first switch circuit including an electric current varying means for varying the current to the first motor and thus the degree of suction of the suction unit and a second switch circuit for energizing the motor of the motor brush unit in cleaning the floor.

---

One of the features of this invention is to provide the above vacuum cleaner structure in which not only is the operation of both of the motors controlled from the switch but in which the speed of the fan motor is controlled so as to regulate the degree of suction obtained.

Other features and advantages of the invention will be apparent from the following description of two embodiments thereof taken in conjunction with the accompanying drawings. Of the drawings:

FIG. 1 is a simplified perspective view of a motor fan suction unit and a motor brush unit interconnected by a hose for conducting a dirt laden air stream from the brush unit. A portion of the motor brush unit housing is broken away to illustrate internal details.

FIG. 2 is a fragmentary enlarged perspective view of a portion of the handle of the vacuum cleaner that carries the control switch.

FIG. 3 is a wiring diagram illustrating a first embodiment of the invention.

FIG. 4 is a second wiring diagram illustrating a second embodiment of the invention.

The vacuum cleaner illustrated in the accompanying drawings comprises a motor fan suction unit or canister 10 and a floor contacting motor brush unit 11 adapted to be propelled over a floor durnig a cleaning operation. The two units are interconnected by a suction hose unit assembly 12 comprising a conventional three-conductor flexible hose 13, which is preferably corrugated, and a curved wand handle portion 14. Handle portion 14 is adapted for connection to a straight metal tube or wand 15 attached to motor brush unit 11 and thus handle portion 14 provides a hand engaging portion for propelling brush unit 11 over a floor. Hose 13 includes three electrical wire conductors 30a, 31a and 34, spaced and insulated from each other and helically wound within the hose 13. The canister 10 and the brush unit 11 each contains an electric motor.

The motor fan suction unit 10 includes a first electric motor 16 of the universal type while the unit 11 is powered by a second electric motor 17, also of the universal type. There are also provided suitable wires 18 and 19 for connecting the conductors of the hose 13 to a conventional plug 9 adapted for connection to an electrical power supply, such as a conventional wall socket (not shown).

The wiring diagram in FIG. 3 indicates three separable manually releasable sections; a canister section 1 at the left side of the wiring diagram; a hose section 2 at the center of the wiring diagram; and a motor brush section 3 at the right side of the wiring diagram. The wiring diagram of FIG. 4 is similarly divided except that reference numerals 100, 200 and 300 are used to denote the three sections. Conventional mating terminals indicated at 8 are used to connect the conductors of the separable sections. There is also provided a switch structure 20 preferably mounted on the handle portion 14 of the hose unit 12 so as to be readily accessible to the hand of a user while the motor brush unit 11 is being propelled over the floor during cleaning.

The switch structure 20 as shown in FIG. 3 is a double pole, triple throw switch, operated by a slidable button 21. The switch structure 20 involves two switching circuits one of which controls the speed of rotation of the first motor 16 and thus the degree of suction set up in the suction unit 10, and the second of which energizes the second motor 17 of the motor brush unit 11.

Thus, as shown in FIG. 3 the switch structure 20 has a plurality of contacts 22, 23, 24, 25, 26, 27, 28 and 29.

The one wire 18 for connection to the source of electric current is connected by a conductor 30 to one side of the second or motor brush electric motor 17 via hose conductor 30a. The other wire 19 for connection to the source of current is connected by a conductor 31 to contacts 25, 26 and 29 via hose conductor 31a. The other side of the brush motor 17 is connected by a conductor 32 to contact 27. Contact 23 is connected by a conductor 33 to a hose conductor 34 which connects a pair of resistors 35 and 36 in series. The conductor 33 is connected to the conductor 34 at a point between the two resistors.

The pairs of contacts 22 and 23, and 24 and 25 serve to define the Off position of the switch structure 20.

The conductor 31 which is connected to the other side of the source of alternating current via wire 19 is connected to one side of the first electric motor 16 by a conductor 37 leading from the conductor 31. The other side of this motor 16 is connected to one side of a gatable conduction device 39 which in the embodiment shown is a bidirectional, current conducting gatable semiconductor device commonly known as a triac. This connection is obtained by an end terminal 38 of triac 39. The other side of this triac 39 is connected by a triac end terminal 40 to the conductor 30 and thus to the one side of the source of alternating current via wire 18. The triac 39 also includes a third or gate terminal 39a connected to the end of the resistor 35 in series with resistor 36. Triacs, which are well known in the electronics art, normally exhibit a high impedance between their end terminals and exhibit a low impedance therebetween in response to the application of a signal, having an amplitude greater than a predetermined magnitude, to their third or gate terminal.

The operation of this first embodiment of the invention is as follows. When the upper and lower switch bar elements associated with slidable button 21 bridge the pairs of contacts 22–23 and 24–25 the structure is of course in its Off position as neither motor is energized. When the button 21 is moved to the right to the High speed position as shown in FIG. 3 to bridge contacts 23–26 and 25–27 the motor 17 is energized to rotate the brush unit 11 by way of plug 9, conductors 18, 30, 30a, 32, terminal 27, lower switch bar, terminal 25, conductors 31a, 31 and 19, to the other side of plug 9. At the same time the motor 16 of the canister suction unit 10 is energized at high speed by way of plug 9, conductor 18, triac end terminals 40 and 38, conductors 37 and 19 to the other side of plug 9, with the signal to the gate terminal 39a via plug 9, conductors 19, 31, 31a, terminal 26, upper switch bar, terminal 23, conductors 33 and 34, and resistor 35 to gate terminal 39a, with the triac 39 being connected to the other side of plug 9 via end terminal 40 and conductor 18. This sets up a high suction in the canister 10 with one example of this being approximately 100 inches of water.

Then when it is desired to operate the vacuum cleaner to obtain a suction at a lower suction level, such as 60 inches of water as one example, the slidable button 21 is moved further to the right to bridge contacts 26–28 and 27–29, thus effecting a Low speed connection. When this occurs the motor 17 of the brush unit will be energized through the lower switch bar bridging the pair of contacts 27–29. However, because the pair of contacts 26 and 28 are now bridged, the suction motor 16 is operated at low speed with the triac gate terminal circuit including both resistors 35 and 36 in series by reason of the end of the resistor 36 being connected to contact 28 of the pair of contacts 26–28, and with contact 28 being energized via the upper switch bar, terminal 26, conductor 31a, conductor 31 to one side of the source of alternating current via wire 19. This establishes a high impedance state signal to the triac gate terminal 39a reducing the speed of the motor 16 accordingly, corresponding to a suction of about 60 inches of water.

The circuit of FIG. 3 provides a first circuit via conductor 34, a second circuit via conductor 31a and a third circuit via conductor 30a all carried by the hose unit 12. Thus both motors can be controlled from one conveniently located switch unit 20 on the handle of the wand. It also provides both high and low suction as the result of different speeds in the suction motor 16 as the high speed is desired for most heavy cleaning tasks while a low speed is desired for gentle cleaning such as vacuuming curtains, draperies and the like. Exemplary values for certain of the components of this embodiment are: triac 39—10 amperes, 120 volts, A.C.; resistor 35—1.7K ohms, 1 watt; resistor 36—6.8K ohms, 1 watt; motor 16—8 amperes, 120 volts A.C.; motor 17—2 amperes, 120 volts A.C.

Similar results are achieved in the circuit diagram embodiment of FIG. 4. Here there is also provided a plug 9 for connection to a source of alternating current and connecting wires 18 and 19 and a conductor 41 leading from one wire 18 for connecting the source to one side of the brush motor 42. The suction or first motor 43 is connected to the other side of the current source by a conductor 44 connecting to wire 19, which also connects this other side to a switch 45 which itself is connected to the brush or second motor 42.

Extending between the conductor 41 leading from the one side of the current source via wire 18 is a conductor 46 which leads to the triac end terminal 47a of a triac 47 that is similar to the triac 39 in the first embodiment. The other side of the triac is connected to the first motor 43 by a triac end terminal 47b and a conductor 48. The triac 47 is provided with a gate terminal 47c connected, in turn, to a diac 49 which of course is a bidirectional conduction device that is not gatable. The opposite side of the diac 49 is connected to a resistor or impedance 50 which is in series connection by way of a conductor 51 with a variable resistor 52 having a variable contact arm 53. The end of the resistor 52 opposite the first resistor 50 is connected by a conductor 54 to the second motor 42. The switch 45 and the variable resistor contact arm 53 are interconnected as indicated at 55 and both are connected to the conductor 54.

In this circuit there is also provided a first condenser 56 connected between the conductor 41 and the conductor 51 at a point between the diac 49 and the first resistor 50. There is also provided a second condenser 57 which is connected in series with a resistor 58 and this series is connected between the conductor 41 and the conductor 48.

In the operation of the device of FIG. 4 closing the switch 45 energizes both motors 42 and 43. The speed of the first or canister motor 43 and thus the degree of suction is controlled by the position of the variable contact arm 53 on the variable resistor 52. However, regardless of this position which of course controls the suction, the brush motor 42 continues to be energized through the switch 45. In this embodiment the variable resistor 52 is controlled by a rotatable knob device (not shown) which comprises the contact arm 53 and this is mounted on the hose unit assembly in the same maner as the switch structure 20 in the first embodiment. The circuit of this second embodiment of FIG. 4 includes the diac 49 to optimize the triggering or activating of the triac 47. The condenser (or capacitor) 57 in series with the resistor 58 that is connected in parallel with the triac 47 provides triac cut-off at the end of each cycle. The condenser 56 functions to improve the operation of the circuit. Exemplary values for certain of the components of this embodiment are: triac 47—10 amperes, 120 volts A.C.; condensers 56 and 57—0.1 microfarad; resistor 50—1.7K ohms, 1 watt; resistor 52—6.8K ohms, 1 watt; resistor 58—100 ohms, 2 watts; diac 49—General Electric Company type ST-2; motor 43—8 amperes, 120 volts A.C.; motor 42—2 amperes, 120 volts. A.C.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A vacuum cleaner, comprising: a motor fan suction unit having a first electric motor; a floor contacting motor brush unit having a second electric motor therein; a suction hose unit connecting said suction unit and motor brush unit having a hand engaging portion for propelling said motor brush unit over a floor; circuit means for connecting both said motors to a source of alternating current including a plurality of current carrying conductors in said hose; and control means for on-off control of said vacuum cleaner and speed control of said first motor comprising a first circuit for connecting said first motor to an alternating current source including an electric current varying means for varying the current to said first motor and thus the degree of suction of said suction unit, a second circuit for connecting said second electric motor to an alternating current source, and switch means for energizing said first and second circuits positioned adjacent said hand engaging portion.

2. The cleaner of claim 1 wherein said motor fan suction unit is connected to said motor brush unit by a suction hose unit having said hand engaging portion as a part thereof.

3. The cleaner of claim 1 wherein said switch is movable to different positions and said current varying means comprises a variable impedance connected to said switch and varied in value by movement of said switch, a gatable conduction device having a terminal thereof connected to the side of said impedance opposite said switch, and means operatively connecting another terminal of said gatable conduction device to said first motor.

4. The cleaner of claim 3 wherein said gatable conduction device is a bidirectional gatable conduction device.

5. The cleaner of claim 4 wherein there is provided a handle having a hand engaging portion for propelling said brush unit over a floor, and said switch is positioned adjacent said hand engaging portion and said motor fan suction unit is connected to said motor brush unit by a suction hose unit having said hand engaging portion as a part thereof.

6. The cleaner of claim 5 wherein said suction hose unit carries three conductors, a first of which connects said gatable conduction device, impedance and a switch, a second of which connects said gatable conduction device to said second motor and to a power source and a third of which connects said switch to the other side of a power source.

7. The cleaner of claim 3 wherein there is provided a first condenser connected to said one side of said source and to said first circuit between said impedance and said gatable conduction device.

8. The cleaner of claim 3 wherein there is provided a nongatable bidirectional conduction device between said gatable conduction device and said impedance.

9. The cleaner of claim 8 wherein there is provided a first condenser connected to said one side of said source and to said first circuit between said impedance and said nongatable conduction device.

10. The cleaner of claim 3 wherein there is provided a second condenser having one side connected to said one side of said source and the opposite side connected to said motor and said gatable conduction device on the side opposite said impedance.

References Cited

UNITED STATES PATENTS

| 2,072,690 | 3/1937 | Smellie | 15—377X |
|---|---|---|---|
| 2,987,751 | 6/1961 | Meyerhoefer | 15—377X |
| 3,413,779 | 12/1968 | Takahashi et al. | 15—327X |

OTHER REFERENCES

"Triac Control for AC Power" by E. K. Howell, pp. 1–7, May 1964.

PETER FELDMAN, Primary Examiner

U.S. Cl. X.R.

15—377